(12) United States Patent
Ishida et al.

(10) Patent No.: US 8,901,423 B2
(45) Date of Patent: Dec. 2, 2014

(54) WIRING HOLDING STRUCTURE FOR VEHICLE SLIDING DOOR

(75) Inventors: Toshihiko Ishida, Aichi-ken (JP); Shigeyuki Miyazaki, Suzuka (JP); Shin Sakai, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 247 days.

(21) Appl. No.: 13/510,568

(22) PCT Filed: Nov. 17, 2010

(86) PCT No.: PCT/JP2010/070506
§ 371 (c)(1),
(2), (4) Date: Jun. 15, 2012

(87) PCT Pub. No.: WO2011/062200
PCT Pub. Date: May 26, 2011

(65) Prior Publication Data
US 2012/0241212 A1  Sep. 27, 2012

(30) Foreign Application Priority Data

Nov. 20, 2009 (JP) .................. 2009-265143

(51) Int. Cl.
*H02G 3/04* (2006.01)
*H01B 7/00* (2006.01)
*H02G 11/00* (2006.01)
*B60R 16/02* (2006.01)
*B60R 16/027* (2006.01)
*F16L 3/12* (2006.01)

(52) U.S. Cl.
CPC .......... *B60R 16/027* (2013.01); *B60R 16/0215* (2013.01); *F16L 3/1226* (2013.01)
USPC .......................... 174/70 C; 174/72 A; 439/43

(58) Field of Classification Search
CPC ......... H02G 3/0437; H02G 3/00; H02G 3/04; H02G 11/00
USPC ................. 174/70 C, 72 A; 439/43
See application file for complete search history.

(56) References Cited

U.S. PATENT DOCUMENTS 6,515,229 B2 *  2/2003  Aoki et al. .................. 174/72 A
6,575,760 B2 *  6/2003  Doshita et al. .................. 439/34
(Continued)

FOREIGN PATENT DOCUMENTS

EP      1 241 057 A1   9/2002
JP      2002-199558 A  7/2002
(Continued)

OTHER PUBLICATIONS

International Preliminary Report on Patentability (Form PCT/IB/373) and the Written Opinion of the International Searching Authority (Form PCT/ISA/237) issued on Jun. 12, 2012, in the corresponding International Application No. PCT/JP2010/070506. (7 pages).

(Continued)

*Primary Examiner* — Jeremy C Norris
*Assistant Examiner* — Nathan Milakovich
(74) *Attorney, Agent, or Firm* — Buchanan Ingersoll & Rooney PC

(57) ABSTRACT

Provided is a wiring holding structure, wherein wiring for electrically connecting a vehicle body to the vehicle sliding door is held in the vehicle body. The wiring holding structure comprises a step member provided adjacent to the vehicle sliding door and a holding portion for holding the wiring. The step member is molded of plastic material. The holding portion is for holding the wiring. The holding portion comprises a first holding portion integrally molded onto the step member; and a second holding member that is fixed to face the first holding section. The second holding member holds the wiring together with the first holding portion. The number of components necessary for the wiring holding structure can thereby be reduced, and the size of the wiring holding structure is made more compact.

10 Claims, 3 Drawing Sheets

(56) References Cited

U.S. PATENT DOCUMENTS

| | | | |
|---|---|---|---|
| 6,668,865 B2 | 12/2003 | Miyamoto et al. | |
| 6,811,404 B2 * | 11/2004 | Doshita et al. | 439/34 |
| 6,968,864 B2 * | 11/2005 | Miyamoto et al. | 138/110 |
| 7,086,687 B2 * | 8/2006 | Aoki et al. | 296/155 |
| 7,109,421 B2 * | 9/2006 | Sekino et al. | 174/72 A |
| 7,265,295 B2 * | 9/2007 | Kogure et al. | 174/72 A |
| 7,375,281 B2 * | 5/2008 | Kogure et al. | 174/72 A |
| 7,381,898 B2 * | 6/2008 | Ide | 174/72 A |
| 7,390,968 B2 * | 6/2008 | Kogure et al. | 174/72 A |
| 7,645,938 B2 * | 1/2010 | Kogure et al. | 174/72 A |
| 8,413,379 B2 * | 4/2013 | Ishida et al. | 49/216 |
| 8,622,408 B2 * | 1/2014 | Ishida et al. | 280/163 |
| 8,777,296 B2 * | 7/2014 | Suzuki et al. | 296/155 |
| 2002/0000499 A1 | 1/2002 | Aoki et al. | |
| 2002/0129963 A1 | 9/2002 | Doshita et al. | |
| 2007/0124923 A1 * | 6/2007 | Kogure | 29/749 |
| 2014/0020952 A1 * | 1/2014 | Nagayasu et al. | 174/72 A |

FOREIGN PATENT DOCUMENTS

| | | | |
|---|---|---|---|
| JP | 2003-054319 A | | 2/2003 |
| JP | 2003-153417 A | | 5/2003 |
| JP | 2003-335189 A | | 11/2003 |
| JP | 2006149109 A | * | 6/2006 |
| JP | 2006149160 A | * | 6/2006 |
| JP | 2007-068346 A | | 3/2007 |
| JP | 2009-023391 A | | 2/2009 |

OTHER PUBLICATIONS

Extended European Search Report issued Mar. 12, 2013, by the European Patent Office in corresponding European Patent Application No. 10831594.6. (5 pages).

* International Search Report (PCT/ISA/210) issued on Feb. 1, 2011, by the Japanese Patent Office as the International Searching Authority for International Application No. PCT/JP2010/070506.

* cited by examiner

WIRING HOLDING STRUCTURE FOR VEHICLE SLIDING DOOR

FIELD OF THE INVENTION

The present invention relates to a wire holding structure that holds, in the body of a vehicle, wires connected to a sliding door of the vehicle.

BACKGROUND OF THE INVENTION

Conventionally, various electric components such as a power window motor and a door lock device are mounted in a sliding door of a vehicle. As a wire holding structure for holding in the body of a vehicle wires connected to the vehicle sliding door, which is actuated to selectively open and close, and connected to electric components mounted in the sliding door, a structure having a holding member formed by joining an upper holding member and a lower holding member each formed of a plastic material, for example, is known. Wires are held in the holding member and the holding member is fixed to the body of a vehicle. See, for example, Patent Document 1. In a wire holding structure described in Patent Document 1, a corrugated tube accommodating a plurality of wires (harnesses) is rotationally held in the holding member such that the wires move in correspondence with opening/closing of the vehicle sliding door, or, in other words, with improved responsiveness. The holding member is fixed to, for example, a step member, which is arranged adjacently to the sliding door, at the rear end of the step member with respect to the vehicle using screws. See, for example, Patent Document 2.

PRIOR ART DOCUMENT

Patent Document

Patent Document 1: Japanese Laid-Open Patent Publication No. 2003-153417
Patent Document 2: Japanese Laid-Open Patent Publication No. 2007-68346

SUMMARY OF THE INVENTION

However, the upper holding member and the lower holding member disadvantageously increase the number of components necessary for forming the wire holding structure. Also, since the corrugated tube (including the wires) is held on the step member through the lower holding portion, the height of the wire holding structure increases. This makes it difficult to provide a low-floor passenger compartment, for example.

Accordingly, it is an objective of the present invention to provide a wire holding structure that has a decreased number of components and is reduced in size.

The present invention provides a wire holding structure for holding, in a body of a vehicle, a wire for electrically connecting the body of the vehicle to a sliding door of the vehicle. The structure includes a step member arranged adjacent to the vehicle sliding door and molded of a plastic material and a holding portion for holding the wire. The holding portion includes a first holding portion molded integrally with the step member and a second holding member fixed to face the first holding portion. The second holding member holds the wire in the space between the second holding member and the first holding portion.

In this configuration, the step member and a part (the first holding portion) of the holding portion are configured by a common component. This decreases the number of the necessary components compared to the configuration in which the holding member formed by joining the upper holding member and the lower holding member is fixed to the step member. Also, the step member is molded from a plastic material instead of metal as in a typical case. The step member is thus allowed to have wide variety of shapes. This facilitates integral formation of the step member and the first holding portion. Further, since the step member and the first holding portion are formed integrally, the step member and the first holding portion are prevented from being overlapped with each other and thus enlarged in size, unlike a case in which the step member and the first holding portion are fixed together as separate bodies. The wire holding structure as a whole is thus reduced in size.

The first holding portion and the second holding member may be engaged with each other by a claw structure.

This configuration decreases the number of the necessary components and facilitates assembly compared to fixation using a screw. Particularly, the claw structure must have a complicated shape to allow claw engagement. However, since the step member is molded from a plastic material, it is easy to form a part (for example, a claw engagement portion) of the claw structure in the step member.

The holding portion may include a cylindrical holding portion, and the wire may be held by a rotary holding member rotationally held by the cylindrical holding portion.

In this configuration, the wire moves in correspondence with opening/closing of the vehicle sliding door with improved responsiveness. Particularly, since the holding portion has the cylindrical holding portion, the first holding portion has a complicated structure. However, the step member is molded from a plastic material and thus allows a part of the cylindrical holding portion to be formed in the first holding portion (the step member).

The holding portion may have a restriction opening formed in an end portion of the holding portion. The restriction opening may become gradually larger toward an end to restrict excessive bending of the wire, and a curved portion forming a part of the restriction opening may be formed in the first holding portion.

This configuration protects the wire and improves responsiveness of the wire in correspondence with opening/closing of the vehicle sliding door. Further, since the step member is molded from a plastic material, the curved portion is easily formed in the first holding portion (the step member).

The wire holding structure may include a corrugated tube for accommodating a plurality of wires, and the holding portion may hold the corrugated tube.

This configuration facilitates handling of the wires.

DETAILED DESCRIPTION OF THE PREFERRED EMBODIMENTS

An embodiment of the present invention will now be described with reference to FIGS. 1 to 4.

Figure 1:
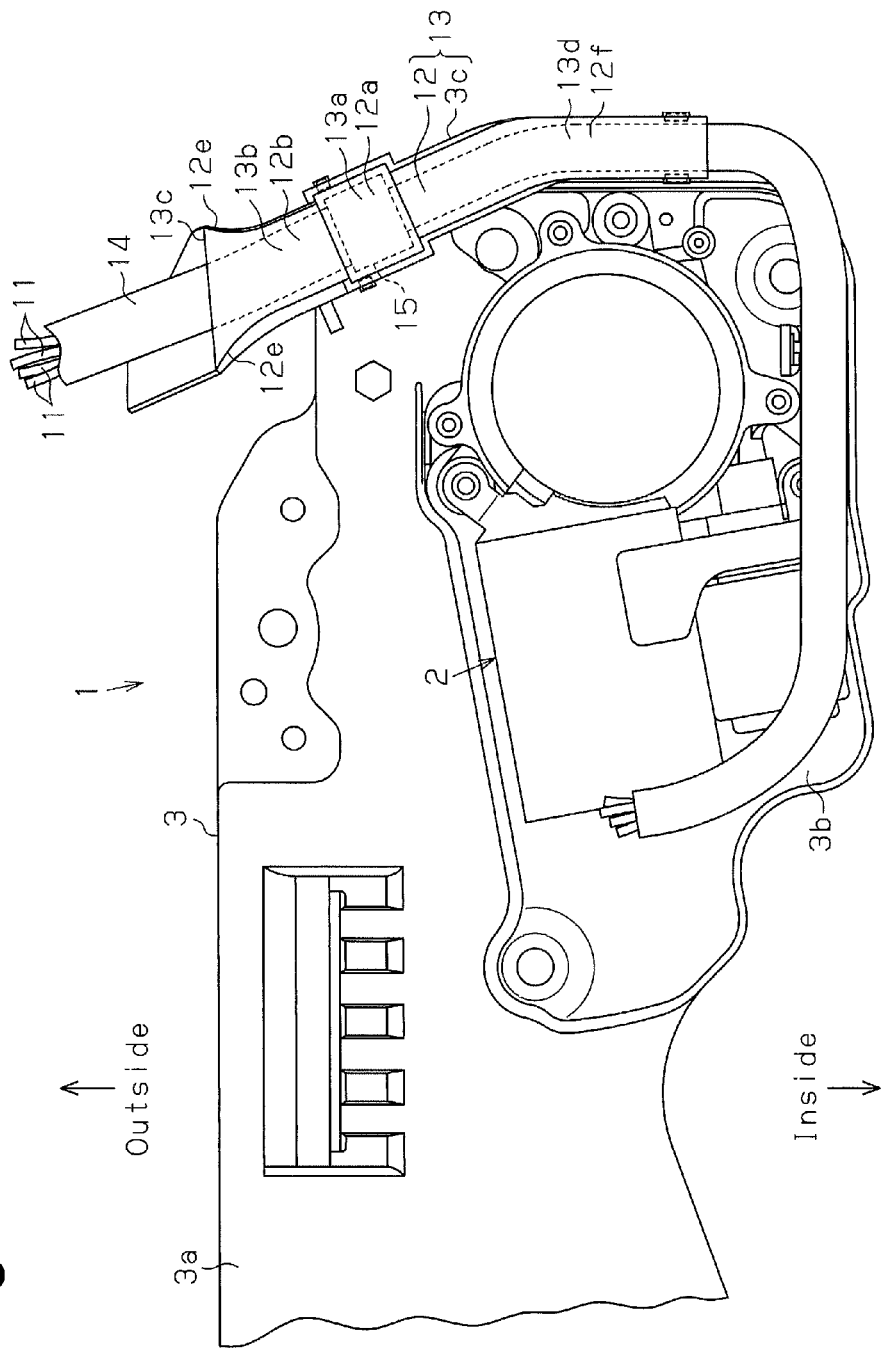
FIG. 1 is a plan view showing a wire holding structure according to an embodiment of the present invention.

As shown in FIG. 1, the vehicle includes a step unit 1, which is arranged adjacently to a non-illustrated sliding door of the vehicle. In FIG. 1, the upward arrow indicates the outer side of the passenger compartment in the width direction of the vehicle. The downward arrow indicates the inner side of the passenger compartment in the width direction of the vehicle.

The step unit 1 is a type including a drive device (a motor unit) 2 for actuating the sliding door to selectively open and close. The step unit 1 is configured mainly by a drive device 2 and a substantially plate-like step member (a step) 3. Specifically, the step unit 1 is fixed to a non-illustrated body serving as the vehicle body. The top surface of the step unit 1 as a whole is covered by a non-illustrated scuff plate, which is a thin plate-like decoration member.

The step member 3 is molded from a plastic material. The step member 3 is located in the passenger compartment adjacent to the vehicle sliding door at the time when the sliding door is closed. The step member 3 includes a flat portion 3a, which functions as a step for an occupant of the vehicle when the occupant enters or leaves the passenger compartment, and a drive device mounting portion 3b. The drive device mounting portion 3b is formed continuously from the flat portion 3a at the front end of the flat portion 3a in the opening direction of the sliding door, which is the rear end of the flat portion 3a with respect to the vehicle. The drive device 2 is fixed to the drive device mounting portion 3b.

Figure 2:
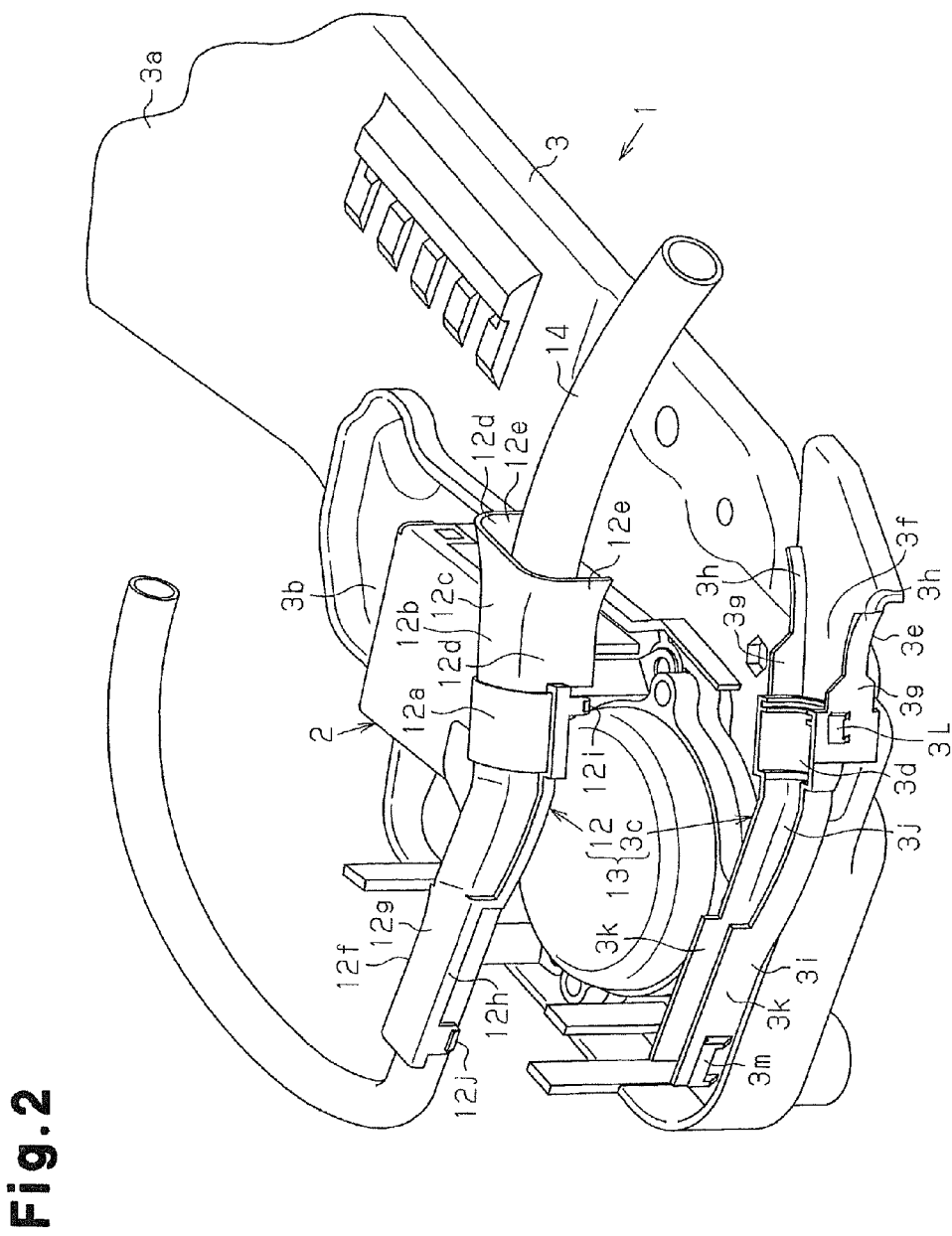
FIG. 2 is an exploded perspective view showing the wire holding structure.

As illustrated in FIG. 2, a first holding portion 3c is formed integrally with the step member 3. Specifically, the first holding portion 3c is formed integrally with the step member 3 at a position rearward to the drive device mounting portion 3b with respect to the vehicle.

The first holding portion 3c has a first semi-cylindrical holding portion 3d. The first semi-cylindrical holding portion 3d is shaped like an arcuate recess that extends about the axis (which extends substantially in the width direction of the vehicle in the illustrated embodiment) parallel to the plane formed by the flat portion 3a and opens upward with respect to the step member 3.

The first holding portion 3c has a first holding portion 3e, which extends from an end of the first semi-cylindrical holding portion 3d that is located outward with respect to the passenger compartment (closer to the vehicle sliding door). The first holding portion 3e has a flat bottom 3f and side walls 3g, which project from opposite sides of the bottom 3f. The recess formed by the bottom 3f and the side walls 3g extends continuously from the first semi-cylindrical holding portion 3d. In the illustrated embodiment, curved portions 3h are formed at positions outward with respect to the side walls 3g in the passenger compartment such that the interval between the curved portions 3h becomes gradually greater toward an end thereof.

The first holding portion 3c also includes a second holding portion 3i, which extends from the other end of the first semi-cylindrical holding portion 3d that is located inward with respect to the passenger compartment. The second holding portion 3i has a bottom 3j and side walls 3k, which project from opposite sides of the bottom 3j. The recess formed by the bottom 3j and the side walls 3k extends continuously from the first semi-cylindrical holding portion 3d.

A second holding member 12 for holding a plurality of wires 11 (see FIG. 1) in the space between the second holding member 12 and the first holding portion 3c is opposed and fixed to the first holding portion 3c. The first holding portion 3c and the second holding member 12 configure a holding portion 13. In other words, the second holding member 12 closes the upper opening end of the first holding portion 3c and configures the holding portion 13, which is tubular as a whole, together with the first holding portion 3c. The wires 11 are received in the tubular holding portion 13. In the illustrated embodiment, the wires 11 are bundled together and accommodated in a corrugated tube 14. The holding portion 13 holds the corrugated tube 14. The wires 11 electrically connect the body (and a power supply mounted in the body) of the vehicle and the sliding door (and the electric components in the sliding door) of the vehicle.

Specifically, the second holding member 12 has a second semi-cylindrical holding portion 12a, which includes a semi-cylindrical portion to configure, together with the first semi-cylindrical holding portion 3d, a cylindrical holding portion 13a (see FIG. 1) having an inner circumferential surface of a true circle.

The second holding member 12 includes a first holding portion 12b to configure a tubular first holding portion 13b (see FIG. 1) together with the first holding portion 3e. The first holding portion 13b extends continuously from the end of the second semi-cylindrical holding portion 12a that is located outward with respect to the passenger compartment (closer to the vehicle sliding door). The first holding portion 12b has a flat top wall 12c and side walls 12d projecting from opposite sides of the top wall 12c. Curved portions 12e are formed at positions outward with respect to the side walls 12d in the passenger compartment such that the interval between the curved portions 12e becomes gradually greater toward an end. As a result, a restriction opening 13c (see FIG. 1) is formed in the first holding portion 13b including the curved portions 3h, 12e. The restriction opening 13c becomes gradually larger to an end to restrict excessive curving, or, in other words, permit slight curving, of the corrugated tube 14 (and the wires 11).

The second holding member 12 has a second holding portion 12f to configure a tubular second holding portion 13d (see FIG. 1) together with the second holding portion 3i. The second holding portion 13d extends continuously from the end of the second semi-cylindrical holding portion 12a that is located inward with respect to the passenger compartment. The second holding portion 12f has a flat top wall 12g and side walls 12h projecting from opposite sides of the top wall 12g (only one of the side walls 12h is illustrated in FIG. 2).

Figure 3:
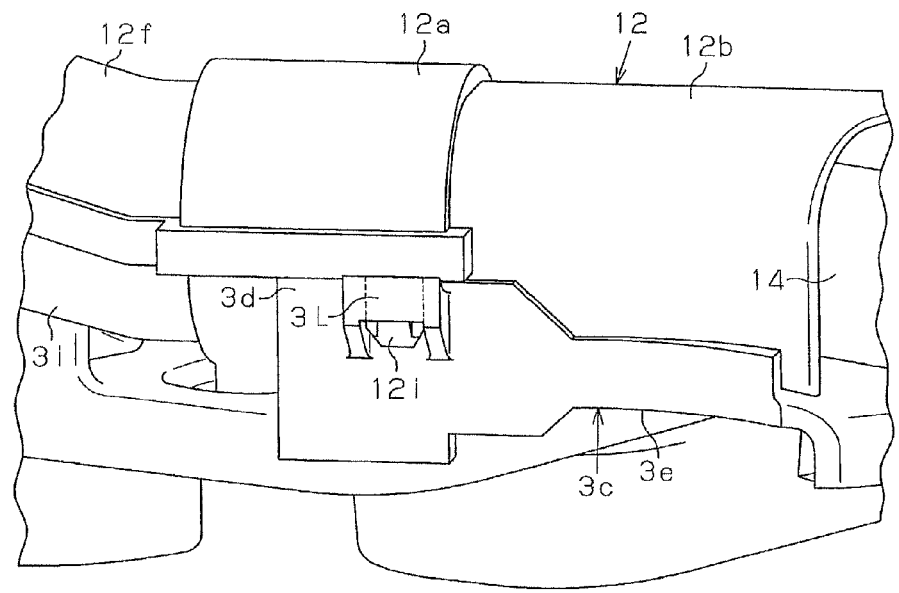
FIG. 3 is a perspective view showing a claw structure of the illustrated embodiment.
Figure 4:
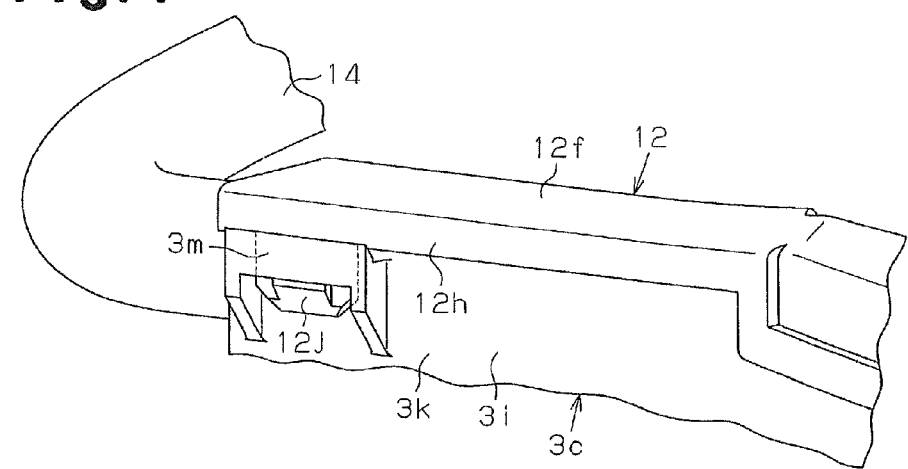
FIG. 4 is another perspective view showing the claw structure.

The second holding member 12 is engaged with the first holding portion 3c by means of a claw structure, which is illustrated in FIGS. 3 and 4. Specifically, in the second holding member 12 of the illustrated embodiment, the second semi-cylindrical holding portion 12a and the second holding portion 12f (or the side walls 12h) have a pair of claw portions 12i and a pair of claw portions 12j, respectively (only one of each pair of the claw portions 12i, 12j is shown in FIGS. 2 to 4). In contrasting, in the first holding portion 3c of the illustrated embodiment, the first semi-cylindrical holding portion 3d and the second holding portion 3i (or the side walls 3k) have claw engagement portions 3l and claw engagement portions 3m, respectively. When the claw portions 12i, 12j are inserted into the corresponding claw engagement portions 3l, 3m from above, the claw engagement portions 3l, 3m stop the claw portions 12i, 12j from separating. As shown in FIGS. 3 and 4, the first holding portion 3c and the second holding member 12 are engaged with each other by means of the claw structure (including the claw portions 12i, 12j and the claw engagement portions 3l, 3m), which is configured as described above.

The corrugated tube 14 (including the wires 11) is held in a state passed through the holding portion 13 (the cylindrical holding portion 13a, the first holding portion 13b, and the second holding portion 13d), which is configured as described above. With reference to FIG. 1, a rotary holding member 15 having a cylindrical shape (the outer circumferential surface forms a true circle) is arranged around the corrugated tube 14 (the wires 11) of the illustrated embodiment to hold the corrugated tube 14 (the wires 11). The rotary holding member 15 is rotationally received and held by the cylindrical holding portion 13a such that the rotary holding member 15 is rotational relative to the holding portion 13 (about the axis of the corrugated tube 14). The portion of the corrugated tube 14 extending out from the second holding portion 13d is electrically connected to, for example, a power supply mounted in the body of the vehicle. The portion of the corrugated tube 14 (including the wires 11) extending out from the first holding portion 13b (the restriction opening 13c) is electrically connected to, for example, an electric component mounted in the vehicle sliding door.

Operation and advantages characteristic to the illustrated embodiment will hereafter be described.

(1) The holding portion 13 is configured by the first holding portion 3c and the second holding member 12. The first holding portion 3c is molded integrally with the step member 3 arranged adjacent to the vehicle sliding door. The second holding member 12 is opposed and fixed to the first holding portion 3c and holds the wires 11 (the corrugated tube 14) in the space between the second holding member 12 and the first holding portion 3c. This configuration decreases the number of the necessary components compared to the technique (the conventional technique) in which the holding member formed by joining the upper holding member and the lower holding member is fixed to the step member. In other words, in the illustrated embodiment, the step member 3 and the first holding portion 3c, which is a portion of the holding portion 13, are configured by a common component, thus decreasing the number of the components. Also, the step member 3, which is typically formed of metal, is molded from a plastic material in the illustrated embodiment. This allows the step member 3 to have wide variety of shapes, thus facilitating integral formation of the step member 3 and the first holding portion 3c. Also, since the step member 3 and the first holding portion 3c are formed integrally with each other, the step member 3 and the first holding portion 3c are prevented from overlapping each other and being enlarged in size, unlike a case where the step member 3 and the first holding portion 3c are fixed together as separate bodies (as in the conventional technique). This reduces the size of the wire holding structure as a whole. As a result, a low-floor passenger compartment, for example, is obtained.

(2) The first holding portion 3c and the second holding member 12 are engaged with each other by means of the claw structure (the claw portions 12i, 12j and the claw engagement portions 3l, 3m). This decreases the number of components and facilitates assembly compared to a case in which the first holding portion 3c and the second holding member 12 are fixed together using, for example, a screw. Particularly, the claw structure must have a complicated shape to allow claw engagement. However, since the step member 3 is molded from a plastic material, portions (for example, the claw engagement portions 3l, 3m) of the claw structure are easily formed in the step member 3.

(3) The holding portion 13 has the cylindrical holding portion 13a. The wires 11 are (the corrugated tube 14 is) held by the rotary holding member 15, which is rotationally held by the cylindrical holding portion 13a. This allows the wires 11 (the corrugated tube 14) to rotate relative to the holding portion 13 (about the axis of the corrugated tube 14). The wires 11 thus move in correspondence with opening/closing of the vehicle sliding door with improved responsiveness. Particularly, since the holding portion 13 has the cylindrical holding portion 13a, the first holding portion 3c has a complicated shape. However, the step member 3 is molded from a plastic material and thus facilitates formation of a portion (the first semi-cylindrical holding portion 3d) of the cylindrical holding portion 13a in the first holding portion 3c (the step member 3).

(4) The holding portion 13 has the restriction opening 13c, which is formed in an end portion of the holding portion 13. The restriction opening 13c becomes gradually larger toward an end to restrict excessive curving, or, in other words, permit slight curving of the wires 11 (the corrugated tube 14). This configuration protects the wires 11 and improves responsiveness of the wires 11 in movement corresponding to opening/closing of the vehicle sliding door. The first holding portion 3c has the curved portions 3h, each of which configures a portion of the restriction opening 13c. However, since the step member 3 is formed from a plastic material, the curved portions 3h are formed easily in the first holding portion 3c.

(5) The multiple wires 11 are accommodated in the corrugated tube 14. The holding portion 13 holds the corrugated tube 14. This configuration facilitates handling of the wires 11.

The illustrated embodiment may be modified to the forms described below.

Engagement between the first holding portion 3c and the second holding member 12 is not restricted to engagement through the claw structure (the claw portions 12i, 12j and the claw engagement portions 3l, 3m), but may be fixed using a screw, for example.

The wires 11 may be held by the holding portion 13 in a non-rotational manner. In other words, the wire holding structure may include neither the cylindrical holding portion 13a nor the rotary holding member 15.

The holding portion 13 may be modified to a holding portion without the restriction opening 13c (the curved portions 3h, 12e). Alternatively, the restriction opening 13c of the illustrated embodiment may gradually enlarge toward an end in upward and downward directions (curved portions may be formed in the bottom 3f and the top wall 12c). Further, such enlargement may be added to the configuration of the embodiment.

The wires 11 do not necessarily have to be received in the corrugated tube 14. In this case, the wires 11 are held by a holding portion without employing the corrugated tube 14.

The step unit 1 does not necessarily have to include the drive device 2. In this case, it is unnecessary for the step member 3 to have the drive device mounting portion 3b.

The invention claimed is:

1. A wire holding structure for holding in a body of a vehicle, a wire for electrically connecting the body of the vehicle to a sliding door of the vehicle, the structure comprising:
   a step member arranged adjacent to the vehicle sliding door and molded of a plastic material; and
   a holding portion for holding the wire,
   wherein the holding portion includes:
   a first holding portion molded integrally with the step member; and
   a second holding member fixed to face the first holding portion with a space between the first holding portion and the second holding member, the second holding member holding the wire in the space between the second holding member and the first holding portion, wherein
   the step member includes a flat portion, which functions as a step for an occupant of the vehicle, and a drive device mounting portion, which is formed continuously from the flat portion at a front end of the flat portion in an opening direction of the sliding door, which is a rear end of the flat portion with respect to the vehicle, and the first holding portion is formed integrally with the step member at a position rearward of the drive device mounting portion with respect to the vehicle.

2. The wire holding structure according to claim 1, wherein the first holding portion and the second holding member are engaged with each other by a claw structure.

3. The wire holding structure according to claim 1, wherein the holding portion includes a cylindrical holding portion, and the wire is held by a rotary holding member rotationally held by the cylindrical holding portion.

4. The wire holding structure according to claim 1, wherein the holding portion has a restriction opening formed in an end portion of the holding portion, the restriction opening becoming gradually larger toward an end to restrict excessive bending of the wire, wherein a curved portion forming a part of the restriction opening is formed in the first holding portion.

5. The wire holding structure according to claim 1, further comprising a corrugated tube for accommodating a plurality of wires, the holding portion holding the corrugated tube.

6. A wire holding structure holding a wire configured to electrically connect a body of a vehicle to a sliding door of the vehicle which is movable to open and close a vehicle compartment in the vehicle, the wire holding structure comprising:

a step configured to be positioned adjacent the sliding door of the vehicle, the step being molded of plastic material and possessing an upper side that faces upwardly when the step is positioned adjacent the sliding door and an oppositely facing lower side;

a holding portion holding the wire;

the holding portion including: a first holding portion molded integrally with the step, and a second holding member fixed relative to the first holding portion so that the first holding portion and the second holding member face one another with a space between the first holding portion and the second holding member;

the wire being held in the space between the first holding portion and the second holding member;

the upper side of the step including a flat portion configured to be stepped on by occupants entering or exiting the vehicle compartment; and the first holding portion being integrally molded with the step so that the first holding portion is at a position relative to the step other than the lower side of the step.

7. The wire holding structure according to claim 6, further comprising a drive device mounting portion formed continuously from the flat portion on the upper side of the step, the drive device mounting portion being configured to mount a motor unit on the upper side of the step at a position between the holding portion and the flat portion.

8. The wire holding structure according to claim 6, wherein the second holding member is fixed relative to the first holding portion by a claw structure that includes claw portions engaging respective claw engagement portions.

9. The wire holding structure according to claim 6, wherein the holding portion includes a cylindrical holding portion, and wherein the wire is held by a rotary holding member rotationally held by the cylindrical holding portion.

10. The wire holding structure according to claim 6, further comprising a restriction opening in an end portion of the holding portion, the restriction opening becoming gradually larger toward an end to restrict excessive bending of the wire, wherein a curved portion forming a part of the restriction opening is formed in the first holding portion.

* * * * *